Patented Apr. 6, 1926.

1,579,326

UNITED STATES PATENT OFFICE.

HAROLD L. KAUFFMAN, OF PARCO, WYOMING, ASSIGNOR TO PRODUCERS AND REFINERS CORPORATION, A CORPORATION OF WYOMING.

PURIFYING AND DECOLORIZING AGENT FOR OILS AND METHOD OF MAKING THE SAME.

No Drawing.   Application filed May 27, 1924.   Serial No. 716,270.

*To all whom it may concern:*

Be it known that I, HAROLD L. KAUFFMAN, a citizen of the United States, residing at Parco, in the county of Carbon and State of Wyoming, have invented certain new and useful Improvements in Purifying and Decolorizing Agents for Oils and Methods of Making the Same, of which the following is a specification.

This invention relates to a purifying and de-colorizing agent for oils and to the method of obtaining the same.

I have found by extensive tests that the mineral leverrierite may by treatment be brought to a condition where it will be efficient as a purifying, de-acidifying and de-colorizing medium for the treatment of oils, and particularly lubricating oils, serving among other things to remove the impurities which commonly deposit carbon in machinery under heat, without affecting the lubricating qualities of said oils.

In carrying out the invention I take leverrierite as it comes from the ground and grind it to such a degree of fineness that ninety-five per cent (95%) of it will pass through a 200 mesh screen. The material is then treated with an acid, preferably sulphuric acid. The acid used is diluted with water to form substantially a twenty per cent (20%) solution. This solution is placed in a lead-lined cooker and the ground leverrierite added. The mixture is digested in this cooker at a suitable temperature and for a suitable length of time. I have found a treatment of from six to eight hours at 200° F. produces efficacious results. Digesting for even considerably longer periods does not injuriously affect the product.

From the cooker the treated leverrierite is transferred to wash vats, and the material is thoroughly washed with water, preferably warm water, several times, usually four times. During the washing operation the material is thoroughly agitated either by air blowing or by mechanical means so that the excess acid and the elements separated from the leverrierite, by the action of the acid, such as aluminum sulphate, are washed out of the leverrierite and may, when the whole has been allowed to settle, be pumped off from the wash vats leaving the purified leverrierite freed therefrom.

It is desirable to prevent oxidation prior to the time of use of the de-colorizing material. One way in which oxidation may be prevented, and which I contemplate employing, is to add to the treated leverrierite a small quantity of previously purified oil of substantially the same physical characteristics as the oil which will subsequently be purified by such material. I add this oil gently and avoid agitation as much as possible during such adding. This oil may be added to the material in the wash vats. The addition of oil to the mass has other important advantages as follows:

1. It reduces to a minimum the evaporation of water from the treated and washed leverrierite, in case the mass stands undisturbed for some time before being used.

2. It serves to prevent oxygen and other gases from the air from being adsorbed by the treated leverrierite, the adsorption of such gases tending to decrease the efficiency of the treated leverrierite.

3. It facilitates the handling of the material by pumps, in subsequent operations.

It is manifest that from an economic standpoint, rapidity of settling is of importance because the excess acid and the elements separated thereby cannot be withdrawn until the settling has been completed. I therefore contemplate adding to the wash water an ingredient or ingredients which will hasten the settling, whereby time is saved and economy in plant operation is effected.

I do not desire to limit this to any particular settling medium. However, by way of illustration, I may mention alcohol which will reduce the specific gravity of the wash water and consequently bring about the more rapid settling of suspended material. Furthermore, alcohol has the tendency to disperse colloidal formations.

It is common practice in the art to mix oils to be purified with various purifying and de-colorizing agents. The treated leverrierite left in the wash vats may be utilized in the common and well-known way in such purifying and de-colorizing of oils. I may use it just as it comes from the wash vats, or I may dry it and thereafter use the same. The material is dried as rapidly as possible at a comparatively low temperature, not to exceed 230° F. I have found that drying at very high temperatures has a tendency to close the pores of the material and to render it unsuitable for use. It is to be understood that this invention is not limited to the particular temperatures or time periods mentioned, these being stated merely by way of illustration and I contemplate varying them as I find to be desirable.

Having described my invention, what I claim is:

1. A purifying and de-colorizing agent for oils having as its base leverrierite, a mineral.

2. A purifying and de-colorizing agent for oils consisting of leverrierite ground to pass through a 200 mesh screen and from which acid soluble constituents have been removed.

3. The hereindescribed method of making a purifying and de-colorizing agent for oils consisting of grinding leverrierite to a degree of fineness to pass through a 200 mesh screen, digesting the same in admixture with dilute acid, and then washing the mixture to remove the excess acid and the elements separated from the leverrierite by the action of the acid.

4. The hereindescribed method of making a purifying and de-colorizing agent for oils consisting of grinding leverrierite to a degree of fineness to pass through a 200 mesh screen, digesting the same in admixture with dilute acid, and then washing the mixture to remove the excess acid and the elements separated from the leverrierite by the action of the acid, and subsequently drying the treated leverrierite.

5. The hereindescribed method of making a purifying and de-colorizing agent for oils consisting of grinding leverrierite to a degree of fineness to pass through a 200 mesh screen, digesting the same in admixture with dilute acid, and then washing the mixture to remove the excess acid and the elements separated from the leverrierite by the action of the acid, and adding an ingredient to the wash water to expedite settling.

6. The hereindescribed method of making a purifying and de-colorizing agent for oils which consists of grinding leverrierite to a fine condition, digesting the same in the presence of a dilute acid, and then washing the same.

7. The hereindescribed method of making a purifying and de-colorizing agent for oils which consists of grinding leverrierite to a fine condition, digesting the same in the presence of a dilute acid, and then washing the same, and adding a small quantity of previously purified oil to exclude air.

8. The hereindescribed method of making a purifying and de-colorizing agent for oils which consists of grinding a hydrated silicate of aluminum to a fine condition, digesting the same in the presence of a dilute acid, washing the same and adding a small quantity of previously purified oil to exclude air.

9. The hereindescribed method of making a purifying and de-colorizing agent for oils, consisting of grinding a hydrated silicate of aluminum to a fine condition, digesting the same in admixture with dilute acid, washing the mixture to remove the excess acid and the elements separated from the hydrated silicate of aluminum by the action of the acid and adding an ingredient to the wash water to expedite settling.

10. The hereindescribed method which consists of grinding leverrierite to a fine condition, digesting the same in the presence of a dilute acid, and then washing the same, and adding a small quantity of previously purified oil to exclude air, and then mixing therewith the oil to be purified and de-colorized.

In testimony whereof I hereunto affix my signature.

HAROLD L. KAUFFMAN.